United States Patent [19]

Perander et al.

[11] Patent Number: 4,999,261

[45] Date of Patent: Mar. 12, 1991

[54] DISPLAY SCREEN WITH REDUCED ELECTROSTATIC FIELD, METHOD AND MEANS FOR MAKING SUCH SCREEN

[76] Inventors: Michael Perander, Diskusvägen 11, S-352 51 Växjö ; Stellan Persson, Förmaksvägen 11, S-352 63 Växjö, both of Sweden

[21] Appl. No.: 340,415

[22] PCT Filed: Oct. 2, 1987

[86] PCT No.: PCT/SE87/00446

§ 371 Date: May 15, 1989

§ 102(e) Date: May 15, 1989

[87] PCT Pub. No.: WO88/02547

PCT Pub. Date: Apr. 7, 1988

[30] Foreign Application Priority Data

Oct. 3, 1986 [SE] Sweden ................................ 8604203

[51] Int. Cl.[5] ................................................ H04N 5/65

[52] U.S. Cl. .................................... 428/697; 252/518; 358/252; 428/702

[58] Field of Search ................ 252/518; 358/245, 247, 358/252, 253; 313/313, 479; 428/684, 702, 697

[56] References Cited

U.S. PATENT DOCUMENTS

| | | | |
|---|---|---|---|
| 4,246,143 | 1/1981 | Sonoda et al. | 252/518 |
| 4,280,931 | 7/1981 | Delsing et al. | 252/518 |
| 4,504,867 | 3/1985 | Keller | 358/247 |
| 4,563,612 | 1/1986 | Deal et al. | 313/479 |
| 4,661,865 | 4/1987 | Schnack | 358/253 |
| 4,681,775 | 7/1987 | Gallaro | 427/66 |
| 4,785,217 | 11/1988 | Matsuda et al. | 313/479 |
| 4,853,791 | 8/1989 | Ginther, Jr. | 358/247 |

*Primary Examiner*—James Seidleck

*Attorney, Agent, or Firm*—Barnes, Kisselle, Raisch, Choate, Whittemore & Hulbert

[57] ABSTRACT

A display screen with reduced electrostatic field has applied to it a thin film (3) which contains $SnO_2$ and $Sb_2O_3$ in a weight ratio of from 99:1 to 91:9, preferably 99:5, and which is earthed.

The display screen is made by applying an aqueous solution which has been prepared from a tin(IV)halide compound and an antimony(III)halide compound in a weight ratio of from 99:1 to 91:9; preferably 95:5;, and from which hydrogen halide formed has been removed, to said display screen in the form of a thin film which is dried and connected to earth.

3 Claims, 1 Drawing Sheet

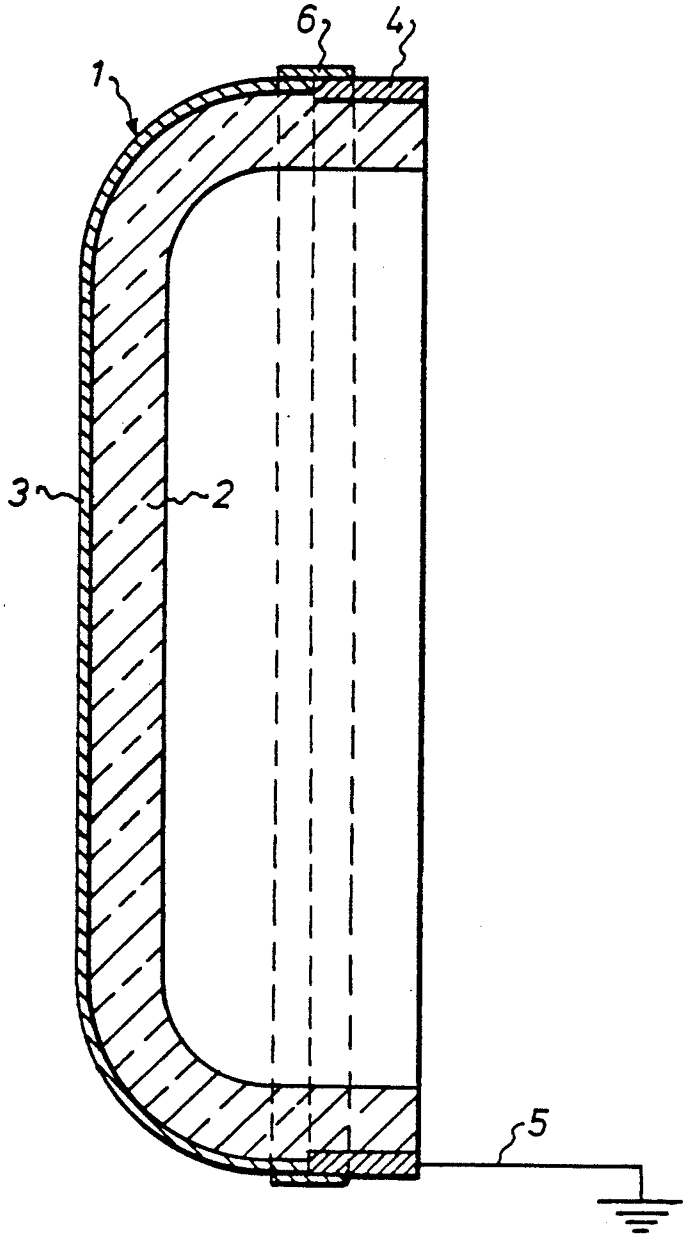
6
4
1
3
2
5

DISPLAY SCREEN WITH REDUCED ELECTROSTATIC FIELD, METHOD AND MEANS FOR MAKING SUCH SCREEN

FIELD OF THE INVENTION

The present invention relates to a display screen with reduced electrostatic field, and also comprises a method and a means for making such screen.

BACKGROUND AND SUMMARY OF THE INVENTION

People working with display screens and various types are exposed to a high degree to the electrostatic field of the screen. It is suspected that the electrostatic field constitutes a considerable health hazard since it has been found that people working with display screens are afflicted to a higher degree than others by, for example, skin irritations in the form of eruptions. It is also suspected that pregnant women working with display screens are exposed to considerable risks. It therefore is a matter of great urgency to eliminate or at least substantially reduce the electrostatic field which occurs in connection with a display screen.

In view hereof, it is one of the objects of this invention to provide a display screen having a greatly reduced electrostatic field.

This object is achieved, according to the present invention, by means of a display screen which is characterized in that it has applied to it a thin film which contains $SnO_2$ and $Sb_2O_3$ in a weight ratio of from 99:1 to 91:9, preferably 95:5, and which is earthed.

The film preferably has a thickness of 5–100 μm.

Another object of the present invention is to provide a method for making a display screen with greatly reduced electrostatic field.

This object is achieved, according to the present invention, by a method which is characterized in that an aqueous solution which is prepared from a tin(IV) halide compound and an antimony(III)halide compound in a weight ratio of from 99:1 to 91:9, preferably 95:5, and from which hydrogen halide formed has been removed, is applied to the display screen in the form of a thin film which is dried and earthed.

Examples of halide compounds are fluorides, chlorides, bromides and iodides of tin(IV) and antimony(III).

The tin halide compound preferably is tin chloride, and the antimony halide compound preferably is antimony chloride.

The aqueous solution is preferably applied to the display screen by screening technique.

The aqueous solution is applied to the display screen in the form of a thin film having a thickness which preferably is 5–100 μm.

A further object of the present invention is to provide a means for making a display screen with greatly reduced electrostatic field.

This object is achieved, according to the present invention, by a means which is characterized in that it consists of an aqueous solution which is prepared from a tin(IV)halide compound and an antimony(III)halide compound in a weight ratio of from 99:1 to 91:9, preferably 95:5, and from which hydrogen halide formed has been removed.

The tin halide compound preferably is tin chloride, and the antimony halide compound preferably is antimony chloride.

BRIEF DESCRIPTION OF THE DRAWINGS

The invention will now be described in more detail, reference being had to the accompanying drawing which is a schematic sectionalized view of a display screen according to the present invention.

DETAILED DESCRIPTION OF THE PREFERRED EMBODIMENTS

The display screen 1 as shown in the drawing comprises a glass wall 2 and an all-covering layer 3 applied to the front face of the glass wall 2. The layer 3 has a thickness of but 5–100 μm. However, in order to enhance the clarity of the drawing, the layer is shown as being considerably thicker in relation to the thickness of the glass wall 2. Furthermore, the display screen 1 has a circumferentially extending metal frame 4 which is earthed, as illustrated schematically by means of an earth connection 5. The layer 3 is connected to the metal frame 4, and thus to earth, by means of a circumferentially extending strip 6 of copper or other high-conductivity material.

To provide the layer 3, one proceeds as follows.

An aqueous solution if prepared from a tin(IV) halide compound and an antimony(III)halide compound in a weight ratio of from 99:1 to 91:9, preferably 95:5, whereupon hydrogen halide formed therein is removed. The aqueous solution is then applied to the glass wall 2 of the display screen 1 in the form of an all-covering thin film 3. If the film is made too thick, or if the hydrogen halide formed is not removed prior to application, the subsequent drying may easily cause fissuring, and if the film is made too thin, the resistivity therein may become too high. In view hereof, the film is preferably given a thickness of 5–100 μm. The aqueous solution preferably is applied by screening technique, although it may of course also be applied in some other suitable manner. Application suitably occurs at a temperature of 20°–50° C.

The applied film 3 is allowed to dry and is finally connected to the earthed metal frame 4 by means of the circumferentially extending strip 6.

In a practical test, 1 liter aqueous solution of 234 ml $SnCl_4$ and 21.5 g $SbCl_3$ was prepared. When $SbCl_3$ is dissolved in water, a hydroxo complex according to the reaction $$SbCl_3+4H_2O \rightarrow Sb(OH)_4^{31}+3HCl+H^+$$

is formed. When $SnCl_4$ is dissolved in water a corresponding reaction $$SnCl_4+5H_2O \rightarrow Sn(OH)_5^{31}+HCl+H^+$$

occurs.

The aqueous solution prepared was stored for one week at atmospheric pressure and room temperature, during which the hydrochloric acid departed from the solution.

The aqueous solution was then applied to thoroughly cleaned display screens, in the form of a thin film having a thickness of about 90 μm at room temperature and by utilizing screening technique. The applied film was then allowed to dry.

During drying, the hydroxo complexes $Sn(OH)_5^-$ and $Sb(OH)_4^{31}$ are converted into the hydroxides $Sn(OH)_4$ and $Sb(OH)_3$ which in turn are converted into the oxides $SnO_2$ and $Sb_2O_3$ according to the reactions $$Sn(OH)_4 \rightarrow SnO_2 + 2H_2O$$

$$2Sb(OH)_3 \rightarrow Sb_2O_3 + 3H_2O.$$

The water then leaves the film.

After drying, there was obtained in this manner a film containing $SnO_2$ and $Sb_2O_3$ in a weight ratio of 95:5. The film formed was connected with an earthed frame corresponding to the frame 4 in the drawing, by means of a circumferentially extending copper strip, whereby the film was earthed.

Measurements conducted before and after application of the film showed that the electrostatic field at the display screens had been reduced from about 15,000 V/m to about 100 V/m.

The concentration of the aqueous solution prepared in the above-mentioned practical test may of course be varied. For example, this variation can be achieved by preparing an aqueous solution of a volume varying between ½ liter and 2 liters with the same amount of $SnCl_4$ (234 ml) and $SbCl_3$ (21.5 g).

It should be emphasized that the above-described method of reducing the electrostatic field may very well be used also for existing display screens since the application and the drying of the film can be carried out at room temperature.

We claim:

1. A display screen with reduced electrostatic field characterized in that it has applied to the outer side of the display screen a thin film which contains $SnO_2$ and $Sb_2O_3$ in a weight ratio of from 99:1 to 91:9 and which is earthed.

2. Display screen as claimed in claim 1 characterized in that said weight ratio is 95:5.

3. Display screen as claimed in claim 1 characterized in that the film has a thickness of 5–100 μm.

* * * * *